UNITED STATES PATENT OFFICE.

THOMAS ALEXANDER IRVINE, OF HORNSEY, ENGLAND, ASSIGNOR TO DONALD McVEAN, OF CHISWICK, LONDON, ENGLAND.

EXTRACTION OF COPPER BY THE WET METHOD.

SPECIFICATION forming part of Letters Patent No. 699,326, dated May 6, 1902.

Application filed December 26, 1900. Serial No. 41,161. (No specimens.)

*To all whom it may concern:*

Be it known that I, THOMAS ALEXANDER IRVINE, chemist, a citizen of Great Britain, residing at "Olivette," Prior road, Hornsey, in the county of Middlesex, England, have invented certain new and useful Improvements in and Relating to the Extraction of Copper by the Wet Method, (for which I have applied for patent in Great Britain, No. 20,702, bearing date November 16, 1900,) of which the following is a full, clear, and exact specification.

This invention relates to a process for the extraction of copper by the wet method, whereby the extraction is simply and thoroughly effected within a short period of time.

The invention relates generally to the treatment of copper ores, such as those in which the copper is present as a carbonate or sulfid in a mixed solution of chlorid of sodium and sulfuric acid.

In carrying the invention into effect a solution is made of chlorid of sodium of a strength, for example, of four ounces to the gallon and a solution of sulfuric acid of a strength, for example, of one fluid ounce of concentrated acid to the gallon. These solutions are poured into a vat, where the ore, which has previously been crushed and reduced to a powder, is introduced and the whole is agitated. The sulfuric acid acts upon the salt, liberating hydrochloric acid, with which the copper unites to form soluble salts, and for the purpose of accelerating the liberation of the hydrochloric acid, and thereby to accelerate the process, the liquid may be heated or a quantity of peroxid of manganese may be introduced. The process ordinarily would be complete within about twenty minutes. By such a process the copper is readily taken into solution and may be precipitated with iron. The molecular proportion of the salt to the acid should in all cases be such that the salt predominates, as the salt, as such, is relied upon to act as a solvent for any cuprous chlorid which is formed in the process. The quantity of untouched salt should be at least four molecules to one molecule of cuprous chlorid formed in order to assure the complete extraction of the copper from the ore.

As will be seen above, we use one fluid ounce of sulfuric weighing 1.835 ounce, which would liberate the hydrochloric acid from a little over two ounces of salt; but with this quantity of acid we used four ounces of salt. There is therefore here an excess of salt amounting to almost two ounces of salt, which in water solution is relied upon as a solvent for the almost insoluble cuprous chlorid.

It is evident that the quantity of solvent solution to be used depends upon the composition of the ore, as also the proportion of acid and salt, and may therefore be varied according to the exigencies.

So, for instance, for an ore containing only a small percentage of cuprous oxid or metallic copper the excess of undecomposed salt may be diminished, while on the other hand an ore containing much cuprous oxid or metallic copper will require more salt in order to extract the copper present as cuprous chlorid completely.

It is to be understood, therefore, that the invention is not limited to the employment of the specific chemical compounds hereinbefore referred to, as solutions of certain of their equivalents may where convenient be substituted; nor yet is it limited to the strength specified, as such may of course be varied according to the kind and quantity of ore that is to be treated.

Instead of a solution of chlorid of sodium sea salt may be employed.

As to the addition of peroxid of manganese to the mixture of sulfuric acid and salt it is known that thereby chlorin is formed, which may convert the cuprous chlorid formed into cupric chlorid, and this may therefore be relied upon to diminish the quantity of cuprous chlorid, which requires a considerable amount of salt for its solution.

Roasted sulfid ores especially contain frequently much cuprous oxid, and the method proposed is therefore in this case of the greatest utility.

What I do claim as my invention, and desire to secure by Letters Patent, is—

1. A process for the extraction of copper consisting in the treatment of the ore within a mixed solution of chlorid of sodium and sulfuric acid in which solution there is an excess by weight of the chlorid of sodium in respect to the sulfuric acid, substantially as described.

2. A process for the extraction of copper, consisting in the treatment of the ore within a mixed solution of chlorid of sodium and sulfuric acid in the proportion of four ounces chlorid of sodium and one fluid ounce of concentrated sulfuric acid to the gallon.

In testimony whereof I have signed my name to this specification in the presence of two subscribing witnesses.

THOMAS ALEXANDER IRVINE.

Witnesses:
 ALFRED GIBBONS,
 WILLIAM EDWARD EVANS.